US011248791B2

(12) United States Patent
Porter et al.

(10) Patent No.: US 11,248,791 B2
(45) Date of Patent: Feb. 15, 2022

(54) PULL-PLANE EFFUSION COMBUSTOR PANEL (71) Applicant: UNITED TECHNOLOGIES CORPORATION, Farmington, CT (US)

(72) Inventors: Steven D Porter, Wethersfield, CT (US); Jon E Sobanski, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 313 days.

(21) Appl. No.: 15/889,764

(22) Filed: Feb. 6, 2018

(65) Prior Publication Data

US 2019/0242579 A1 Aug. 8, 2019

(51) Int. Cl.
F23R 3/06 (2006.01)
B22C 7/02 (2006.01)
F01D 25/12 (2006.01)
F23R 3/00 (2006.01)
B22D 25/02 (2006.01)
(Continued)

(52) U.S. Cl.
CPC ............... F23R 3/06 (2013.01); B22C 7/02 (2013.01); B22D 25/02 (2013.01); F01D 25/12 (2013.01); F02C 7/24 (2013.01); F02K 1/822 (2013.01); F02K 3/06 (2013.01); F23R 3/002 (2013.01); F23R 3/50 (2013.01); F05D 2220/32 (2013.01); F05D 2230/10 (2013.01); F05D 2230/12 (2013.01); F05D 2230/21 (2013.01); F05D 2230/211 (2013.01); F05D 2240/15 (2013.01); F05D 2240/35 (2013.01); F05D 2260/201 (2013.01); F05D 2260/202 (2013.01); F23R 2900/00018 (2013.01);
(Continued)

(58) Field of Classification Search
CPC .... F23R 3/06; F23R 3/002; F23R 3/50; F23R 2900/00018; F23R 2900/03041; F23R 2900/03042; F23R 2900/03044; F02K 1/822; F01D 25/12; F05D 2230/10; F05D 2240/15; F05D 2260/201; F05D 2260/202
See application file for complete search history.

(56) References Cited

U.S. PATENT DOCUMENTS 4,158,949 A   6/1979 Reider
4,242,871 A   1/1981 Breton
(Continued)

FOREIGN PATENT DOCUMENTS

EP   1503144   2/2005
EP   3088100   11/2016
(Continued)

OTHER PUBLICATIONS

USPTO, Sobanski et al., U.S. Appl. No. 15/902,171, filed Feb. 22, 2018 and entitled Multi-Direction Hole for Rail Effusion.
(Continued)

Primary Examiner — Arun Goyal
(74) Attorney, Agent, or Firm — Snell & Wilmer L.L.P.

(57) ABSTRACT

A heat shield panel for a gas turbine engine combustor is disclosed. The heat shield panel includes a hot side defining a first surface having an outer perimeter, a cold side defining a second surface spaced from the first surface and a plurality of holes, each hole including a central axis having vector components defined by a common vector.

13 Claims, 9 Drawing Sheets (51) Int. Cl.
  *F23R 3/50* (2006.01)
  *F02K 1/82* (2006.01)
  *F02C 7/24* (2006.01)
  *F02K 3/06* (2006.01)

(52) U.S. Cl.
  CPC .............. *F23R 2900/03041* (2013.01); *F23R 2900/03042* (2013.01); *F23R 2900/03044* (2013.01)

(56) References Cited

U.S. PATENT DOCUMENTS

| | | | |
|---|---|---|---|
| 5,079,915 A | 1/1992 | Veau | |
| 5,419,681 A | 5/1995 | Lee | |
| 6,029,455 A | 2/2000 | Sandelis | |
| 6,606,861 B2* | 8/2003 | Snyder | F23R 3/002 60/752 |
| 6,810,673 B2 | 11/2004 | Snyder | |
| 7,146,815 B2* | 12/2006 | Burd | F23R 3/002 60/752 |
| 7,812,282 B2 | 10/2010 | Kuhn et al. | |
| 8,069,648 B2* | 12/2011 | Snyder | F02C 7/18 60/262 |
| 8,291,709 B2 | 10/2012 | Cayre et al. | |
| 9,429,323 B2* | 8/2016 | Richardson | F23R 3/04 |
| 9,518,739 B2 | 12/2016 | Hu | |
| 9,555,470 B1 | 1/2017 | Heneveld et al. | |
| 9,752,447 B2 | 9/2017 | Clum et al. | |
| 2001/0005555 A1 | 6/2001 | Kreis | |
| 2002/0124572 A1 | 9/2002 | Pidcock | |
| 2004/0146399 A1 | 7/2004 | Balms | |
| 2006/0037323 A1* | 2/2006 | Reynolds | F23R 3/06 60/754 |
| 2006/0059916 A1 | 3/2006 | Cheung | |
| 2007/0245742 A1 | 10/2007 | Dahlke | |
| 2007/0283700 A1 | 12/2007 | Gerendas | |
| 2008/0271457 A1 | 11/2008 | McMasters | |
| 2009/0077974 A1 | 3/2009 | Dahlke | |
| 2009/0199837 A1 | 8/2009 | Tschirren | |
| 2010/0095679 A1 | 4/2010 | Rudrapatna | |
| 2011/0197590 A1 | 8/2011 | Bottcher | |
| 2012/0272652 A1 | 11/2012 | Nicholls | |
| 2014/0096528 A1 | 4/2014 | Cunha et al. | |
| 2014/0238030 A1 | 8/2014 | Gerendas | |
| 2014/0290258 A1 | 10/2014 | Gerendas et al. | |
| 2015/0027127 A1 | 1/2015 | Clemen | |
| 2015/0292741 A1 | 10/2015 | Cunha et al. | |
| 2015/0354818 A1 | 12/2015 | Lebel | |
| 2015/0377033 A1 | 12/2015 | Xu | |
| 2016/0003056 A1 | 1/2016 | Xu | |
| 2016/0054001 A1 | 2/2016 | Bangerter | |
| 2016/0097285 A1 | 4/2016 | Harding | |
| 2016/0097325 A1 | 4/2016 | Harding et al. | |
| 2016/0102860 A1 | 4/2016 | Chandler | |
| 2016/0177758 A1 | 6/2016 | Clum et al. | |
| 2016/0193667 A1 | 7/2016 | Luketic | |
| 2016/0208704 A1 | 7/2016 | Bouldin | |
| 2016/0230996 A1 | 8/2016 | Kostka | |
| 2016/0238253 A1 | 8/2016 | Moura | |
| 2016/0245094 A1 | 8/2016 | Bunker | |
| 2016/0252249 A1 | 9/2016 | Erbas-Sen | |
| 2016/0258626 A1 | 9/2016 | Moura | |
| 2016/0265775 A1 | 9/2016 | Cunha | |
| 2016/0273363 A1 | 9/2016 | Bunker | |
| 2016/0273772 A1 | 9/2016 | Cunha et al. | |
| 2016/0305325 A1 | 10/2016 | Cunha | |
| 2016/0377289 A1 | 12/2016 | Kostka, Jr. | |
| 2017/0009987 A1* | 1/2017 | McKinney | F23R 3/002 |
| 2017/0114798 A1* | 4/2017 | Spangler | F23R 3/02 |
| 2017/0205069 A1 | 7/2017 | Tentorio | |
| 2017/0227220 A1 | 8/2017 | Schilp et al. | |
| 2017/0241643 A1 | 8/2017 | Mulcaire | |
| 2017/0276356 A1 | 9/2017 | Mulcaire | |
| 2017/0298743 A1 | 10/2017 | Webster | |
| 2017/0356653 A1 | 12/2017 | Bagchi | |
| 2018/0073736 A1 | 3/2018 | Papple | |
| 2018/0238545 A1 | 8/2018 | Quach | |
| 2018/0238547 A1 | 8/2018 | Quach | |
| 2018/0335212 A1 | 11/2018 | Quach | |
| 2019/0242580 A1 | 8/2019 | Porter | |
| 2019/0257206 A1 | 8/2019 | Weebster | |
| 2019/0285276 A1 | 9/2019 | Porter | |
| 2020/0033003 A1 | 1/2020 | Gerendas | |
| 2020/0041126 A1 | 2/2020 | Anderson | |

FOREIGN PATENT DOCUMENTS

| | | |
|---|---|---|
| EP | 3112755 | 1/2017 |
| EP | 3183497 | 6/2017 |
| GB | 2317005 | 3/1998 |
| WO | 2008017551 | 2/2008 |
| WO | 2014169127 | 10/2014 |
| WO | 2015108584 | 7/2015 |
| WO | 2015112220 | 7/2015 |
| WO | 2015112221 | 7/2015 |

OTHER PUBLICATIONS

USPTO, Pre-Interview First Office Action dated Feb. 25, 2020 in U.S. Appl. No. 15/889,816.
European Patent Office, European Search Report dated Mar. 6, 2019 in Application No. 19154252.1.
European Patent Office, European Search Report dated Mar. 21, 2019 in Application No. 19155472.4.
European Patent Office, European Search Report dated Apr. 3, 2019 in Application No. 19156740.3.
Porter et al, U.S. Appl. No. 15/889,793, filed Feb. 6, 2018 and entitled Undercut Combustor Panel Rail.
Sobanski et al, U.S. Appl. No. 15/889,816, filed Feb. 6, 2018 and entitled Diffusing Hole Rail Effusion.
European Patent Office, European Search Report dated Sep. 16, 2019 in Application No. 19154249.7.
USPTO, Restriction/Election Requirement dated Oct. 24, 2019 in U.S. Appl. No. 15/889,793.
USPTO, Restriction/Election Requirement dated Dec. 13, 2019 in U.S. Appl. No. 15/889,816.
USPTO, Non-Final Office Action dated Jan. 21, 2020 in U.S. Appl. No. 15/889,793.
USPTO, Restriction/Election Requirement dated Nov. 1, 2019 in U.S. Appl. No. 15/902,171.
USPTO, Restriction/Election Requirement dated Jan. 16, 2020 in U.S. Appl. No. 15/902,171.
European Patent Office, European Search Report dated Jun. 13, 2019 in Application No. 19154249.7.
USPTO, Final Office Action dated Jun. 25, 2020 in U.S. Appl. No. 15/889,793.
USPTO, First Action Interview Office Action dated Jun. 16, 2020 in U.S. Appl. No. 15/889,816.
USPTO, First Action Interview Office Action dated Jul. 1, 2020 in U.S. Appl. No. 15/902,171.
European Patent Office, European Office Action dated Jun. 19, 2020 in Application No. 19154249.7.
Uspto, Pre-Interview First Office Action dated May 4, 2020 in U.S. Appl. No. 15/902,171.
USPTO, Notice of Allowance dated Aug. 25, 2020 in U.S. Appl. No. 15/889,816.
USPTO, Advisory Action dated Aug. 31, 2020 in U.S. Appl. No. 15/889,793.
USPTO, Final Office Action dated Nov. 4, 2020 in U.S. Appl. No. 15/902,171.
USPTO, Notice of Allowance dated Jan. 22, 2021 in U.S. Appl. No. 15/889,793.
USPTO, Notice of Allowance dated Jan. 28, 2021 in U.S. Appl. No. 15/902,171.

* cited by examiner

PULL-PLANE EFFUSION COMBUSTOR PANEL

FIELD

The present disclosure relates to gas turbine engines and, more particularly, to effusion panels used in the combustors of gas turbine engines.

BACKGROUND

Gas turbine engines, such as those that power modern commercial and military aircraft, include a fan section to propel the aircraft, a compressor section to pressurize a supply of air from the fan section, a combustor section to burn a hydrocarbon fuel in the presence of the pressurized air, and a turbine section to extract energy from the resultant combustion gases and generate thrust.

The combustor section typically includes a bulkhead assembly, an inner liner assembly and an outer liner assembly. The bulkhead assembly extends radially between the inner liner assembly and the outer liner assembly to define a combustion chamber. Each liner assembly can be formed from one or more panels and one or more shells. Cooling cavities reside between the panels and the shells. The cooling cavities fluidly couple impingement apertures defined in the shells with effusion apertures defined in the panels.

SUMMARY

A heat shield panel for a gas turbine engine combustor is disclosed. In various embodiments, the heat shield panel includes a hot side defining a first surface having an outer perimeter, a cold side defining a second surface spaced from the first surface and a plurality of holes extending through the heat shield panel, each hole including a central axis having vector components defined by a common vector.

In various embodiments, a first group of the plurality of holes is positioned on a first orientation extending from a first axial end of the outer perimeter of the heat shield panel to a second axial end of the outer perimeter of the heat shield panel. In various embodiments, a second group of the plurality of holes is positioned on a second orientation, extending from the first axial end to the second axial end and offset a spacing from the first orientation. In various embodiments, a first group of the plurality of holes is positioned on a first circumferential line extending from a first circumferential end of the outer perimeter of the heat shield panel to a second circumferential end of the outer perimeter of the heat shield panel. In various embodiments, a second subset of the plurality of holes is positioned on a second circumferential line, extending from the first circumferential end to the second circumferential end and offset an axial spacing from the first circumferential line. In various embodiments, one or more holes within the plurality of holes includes a tapered profile such that a first hole opening positioned on the hot side has a larger cross sectional area than a second hole opening positioned on the cold side.

A method of fabricating a combustor panel for use in a gas turbine engine combustor is disclosed. In various embodiments, the method includes the steps of forming a combustor panel having a cold side and a hot side and forming a plurality of holes in the combustor panel, the plurality of holes including a group of holes, each hole within the group of holes including a central axis having vector components defined by a common vector. In various embodiments, the group of holes comprises a subset of the plurality of holes. In various embodiments, the group of holes comprises each hole within the plurality of holes. In various embodiments, the step of forming the combustor panel comprises a casting process. In various embodiments, the step of forming the plurality of holes occurs during the casting process. In various embodiments, the casting process defines a pull plane having substantially the same vector components defining the common vector.

In various embodiments, the step of forming the plurality of holes comprises one or more of electrical discharge machining, laser drilling and water jet frilling, following the casting step. In various embodiments, the plurality of holes is formed using a comb element configured to form multiple holes simultaneously. In various embodiments, the plurality of holes is formed using a plurality of comb elements, each comb element configured to form multiple holes simultaneously.

In various embodiments, the comb element is configured to traverse the combustor panel in an axial direction with respect to the combustor panel and a first subset of the plurality of holes is formed while the comb element is positioned at a first axial location and a second subset of the plurality of holes is formed while the comb element is positioned at a second axial location. In various embodiments, the comb element is configured to traverse the combustor panel in a circumferential direction with respect to the combustor panel and a first subset of the plurality of holes is drilled while the comb element is positioned at a first circumferential location and a second subset of the plurality of holes is drilled while the comb element is positioned at a second circumferential location.

A heat shield panel for a gas turbine engine combustor is disclosed. In various embodiments the heat shield includes a first wall having a hot side defining a first surface having an outer perimeter and a cold side defining a second surface spaced from the first surface, a second wall spaced from the first wall such that a cavity is formed between the first wall and the second wall and a plurality of holes extending through the first wall, each hole including a central axis having vector components defined by a common vector. In various embodiments, a first group of the plurality of holes is positioned on a first orientation extending from a first axial end of the outer perimeter of the heat shield panel to a second axial end of the outer perimeter of the heat shield panel. In various embodiments, a first group of the plurality of holes is positioned on a first circumferential line extending from a first circumferential end of the outer perimeter of the heat shield panel to a second circumferential end of the outer perimeter of the heat shield panel.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
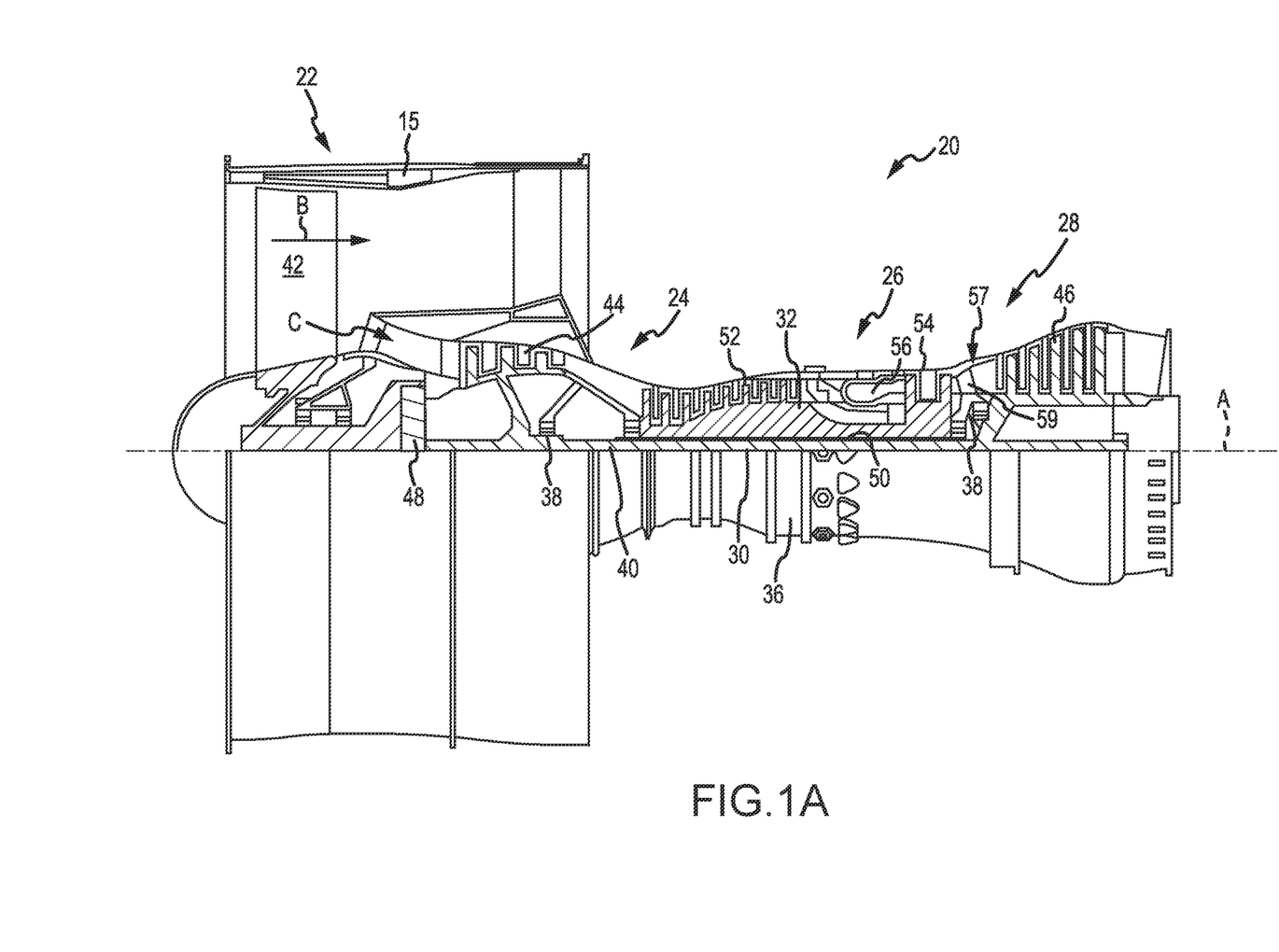
FIG. 1A is a schematic cross section of a gas turbine engine, in accordance with various embodiments.

Referring now to the drawings, FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a primary or core flow path C for compression and communication into the combustor section 26 and then expansion through the turbine section 28. Although depicted as a two-spool turbofan gas turbine engine in the disclosed non-limiting embodiment, it will be understood that the concepts described herein are not limited to use with two-spool turbofans as the teachings may be applied to other types of turbine engines including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with their longitudinal axes.

The air in the core flow path is compressed by the low pressure compressor 44 and then the high pressure compressor 52, mixed and burned with fuel in the combustor 56, and then expanded over the high pressure turbine 54 and low pressure turbine 46. The low pressure turbine 46 and the high pressure turbine 54 rotationally drive the respective low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Figure 1B:
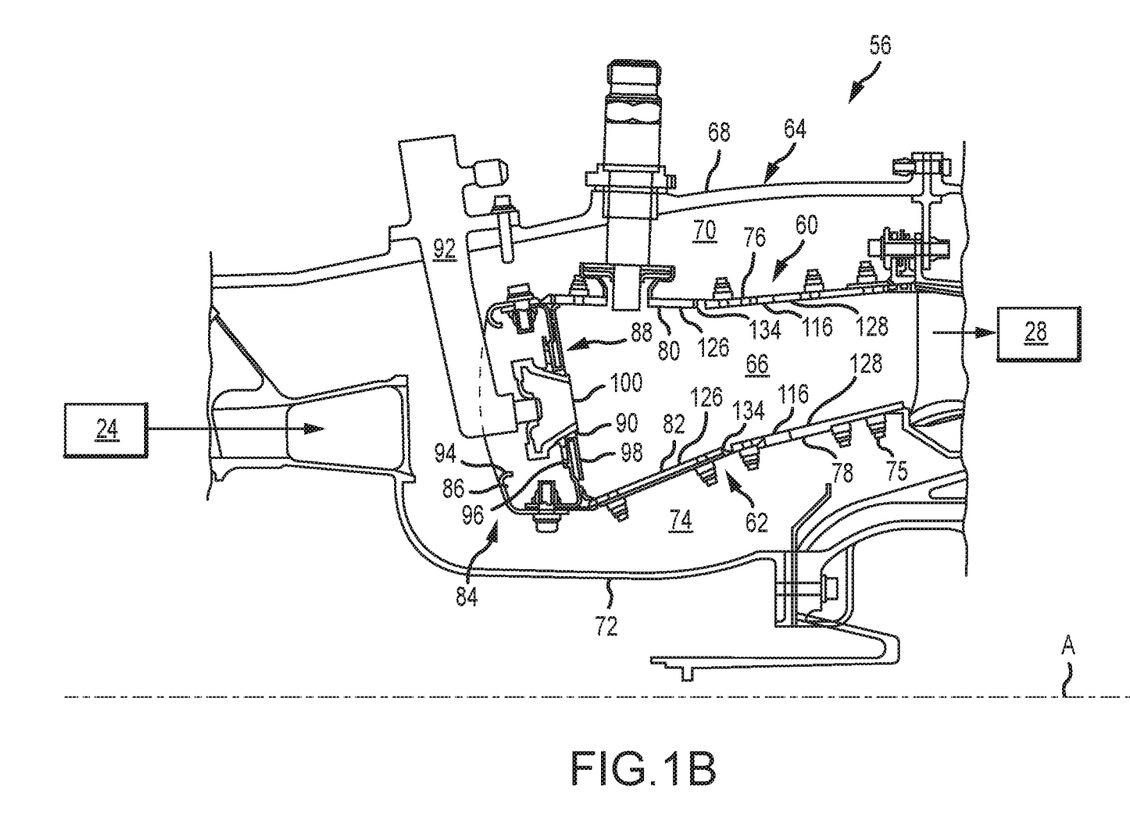
FIG. 1B is a schematic cross section of a combustor section of a gas turbine engine, in accordance with various embodiments.

Referring to FIG. 1B, the combustor 56 may generally include an outer liner assembly 60, an inner liner assembly 62 and a diffuser case module 64 that surrounds the outer liner assembly 60 and the inner liner assembly 62. A combustion chamber 66, positioned within the combustor 56, has a generally annular configuration, defined by and comprising the outer liner assembly 60, the inner liner assembly 62 and a bulkhead liner assembly 88. The outer liner assembly 60 and the inner liner assembly 62 are generally cylindrical and radially spaced apart, with the bulkhead liner assembly 88 positioned generally at a forward end of the combustion chamber 66. The outer liner assembly 60 is spaced radially inward from an outer diffuser case 68 of the diffuser case module 64 to define an outer annular plenum 70. The inner liner assembly 62 is spaced radially outward from an inner diffuser case 72 of the diffuser case module 64 to define, in-part, an inner annular plenum 74. Although a particular combustor is illustrated, it should be understood that other combustor types with various combustor liner arrangements will also benefit from this disclosure. It should be further understood that the disclosed cooling flow paths are but an illustrated embodiment.

The combustion chamber 66 contains the combustion products that flow axially toward the turbine section 28. The outer liner assembly 60 includes an outer support shell 76 and the inner liner assembly 62 includes an inner support shell 78. The outer support shell 76 supports one or more outer panels 80 and the inner support shell 78 supports one or more inner panels 82. Each of the outer panels 80 and the inner panels 82 may be formed of a plurality of floating panels that are generally rectilinear and manufactured from, for example, a nickel based super alloy that may be coated with a ceramic or other temperature resistant material, and are arranged to form a panel configuration mounted to the respective outer support shell 76 and inner support shell 78. In various embodiments, the combination of the outer support shell 76 and the outer panels 80 is referred to an outer heat shield or outer heat shield liner, while the combination of the inner support shell 78 and the inner panels 82 is referred to as an inner heat shield or inner heat shield liner. In various embodiments, the panels are secured to the shells via one or more attachment mechanisms 75, which may each comprise a threaded stud and nut assembly.

The combustor 56 further includes a forward assembly 84 that receives compressed airflow from the compressor section 24 located immediately upstream. The forward assembly 84 generally includes an annular hood 86, a bulkhead liner assembly 88, and a plurality of swirlers 90 (one shown). Each of the swirlers 90 is aligned with a respective one of a plurality of fuel nozzles 92 (one shown) and a respective one of a plurality of hood ports 94 (one shown) to project through the bulkhead liner assembly 88; generally, the pluralities of swirlers 90, fuel nozzles 92 and hood ports 94 are circumferentially distributed about the annular hood 86 and the bulkhead liner assembly 88. The bulkhead liner assembly 88 includes a bulkhead support shell 96 secured to the outer liner assembly 60 and to the inner liner assembly 62 and a plurality of bulkhead panels 98 secured to the bulkhead support shell 96; generally, the bulkhead panels 98 are circumferentially distributed about the bulkhead liner assembly 88. The bulkhead support shell 96 is generally annular and the plurality of bulkhead panels 98 is segmented, typically one panel to each of the fuel nozzles 92 and swirlers 90. The annular hood 86 extends radially between, and is secured to, the forward-most ends of the outer liner assembly 60 and the inner liner assembly 62. Each of the hood ports 94 receives a respective one of the plurality of fuel nozzles 92 and facilitates the direction of compressed air into the forward end of the combustion chamber 66 through a respective one of a plurality of swirler openings 100. Each of the fuel nozzles 92 may be secured to the diffuser case module 64 and project through a respective one of the hood ports 94 and into a respective one of the swirlers 90.

The forward assembly 84 introduces core compressed air into the forward section of the combustion chamber 66 while the remainder of the compressed air enters the outer annular plenum 70 and the inner annular plenum 74. The plurality of fuel nozzles 92 and adjacent structure generate a blended fuel-air mixture that supports stable combustion in the combustion chamber 66. Air in the outer annular plenum 70 and the inner annular plenum is also introduced into the combustion chamber 66 via a plurality of orifices 116, which may include dilution holes or air feed holes of various dimension. The outer support shell 76 may also include a plurality of impingement holes (discussed further below) that introduce cooling air from the outer annular plenum 70 into a space between the outer support shell 76 and a cool side of the outer panels 80. The cooling air is then communicated through a plurality of effusion holes in the outer panels 80 to form a cooling air film across a hot side of the outer panels 80 to thermally protect the outer panels 80 from hot combustion gases. Similarly, the inner support shell 78 may include a plurality of impingement holes that introduce cooling air from the inner annular plenum 74 into a space between the inner support shell 78 and a cool side of the inner panels 82. The cooling air is then communicated through a plurality of effusion holes in the inner panels 82 to form a cooling air film across a hot side of the inner panels 82 to thermally protect the inner panels 82 from hot combustion gases.

Figure 1C:
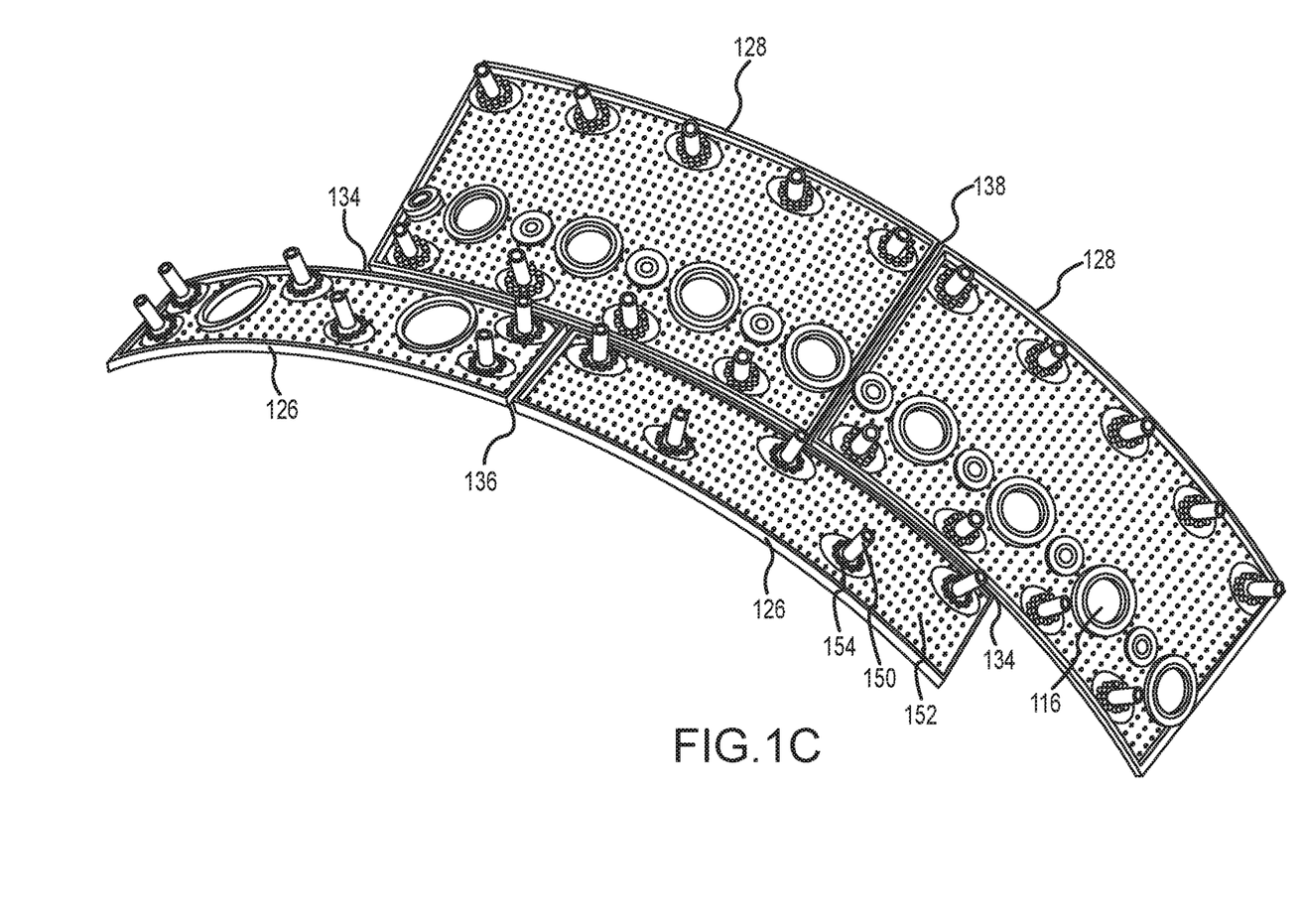
FIG. 1C is a schematic perspective of a heat shield panel arrangement of a combustor, viewing from a cold side, according to various embodiments.

Turning now to FIG. 1C (with continued reference to FIG. 1B), an illustration of a configuration of circumferentially adjacent first panels 126 and circumferentially adjacent second panels 128 installed within the combustor 56 is shown. The circumferentially adjacent first panels 126 are installed to extend circumferentially about the combustion chamber 66 and form a first axially extending gap 136 between the circumferentially adjacent first panels 126. Similarly, the circumferentially adjacent second panels 128 are installed to extend circumferentially about the combustion chamber 66 and form a second axially extending gap 138 between the circumferentially adjacent second panels 128. A first circumferentially extending gap 134 is also formed between the circumferentially adjacent first panels 126 and the circumferentially adjacent second panels 128 when positioned axially adjacent one another. Similar axially extending and circumferentially extending gaps are formed between similar panels positioned throughout the combustion chamber 66. The first circumferentially extending gap 134, the first axially extending gap 136 and the second axially extending gap 138 accommodate movement or thermal expansion of the circumferentially adjacent first panels 126 and the circumferentially adjacent second panels 128. Also shown in FIG. 1C is the plurality of orifices 116, that may include dilution holes or air feed holes of various dimension, a plurality of effusion holes 152 and a shield attachment mechanism, which includes a stud 150 and a plurality of spacer pins 154.

Figure 2:
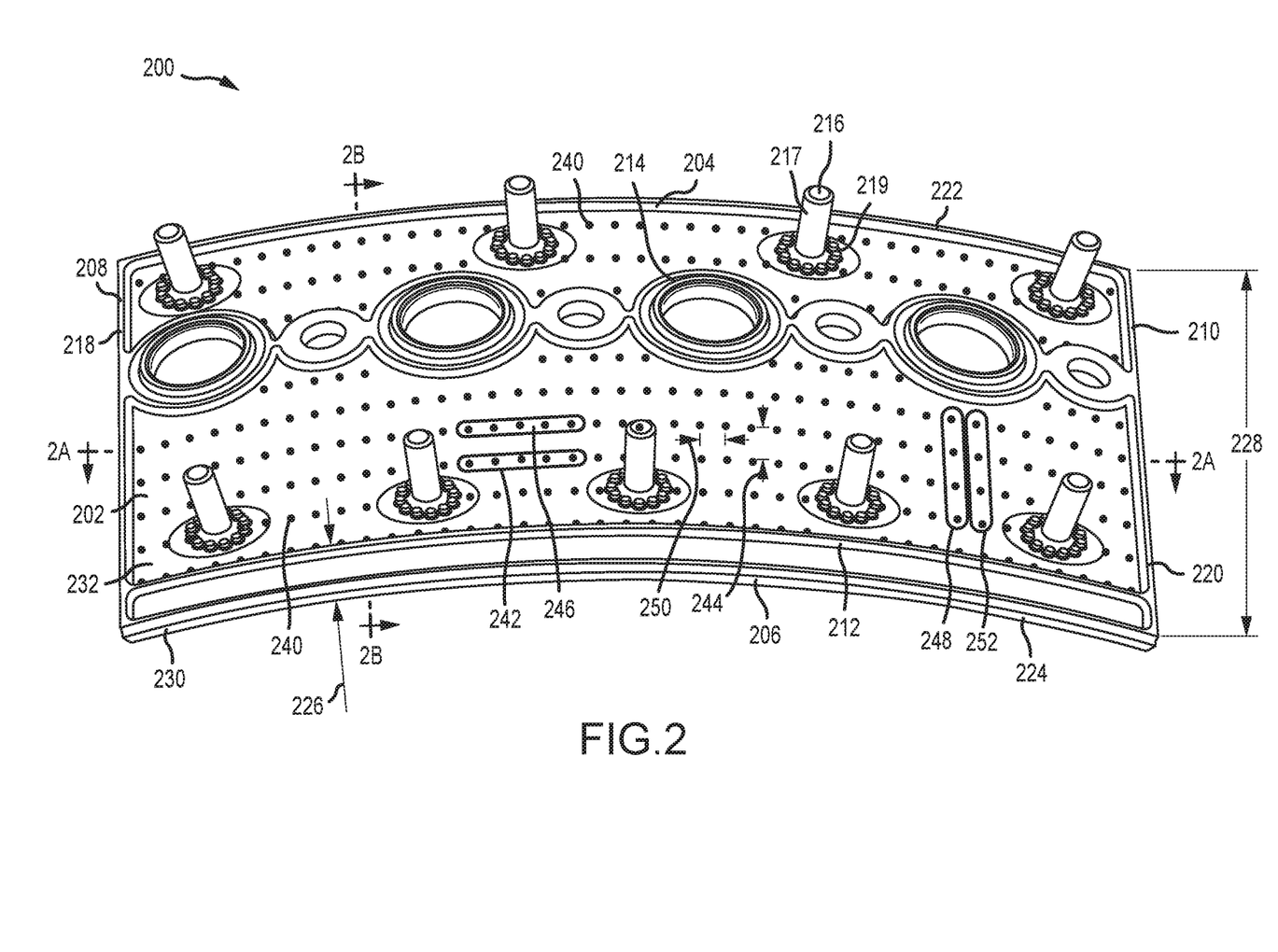
FIG. 2 is a schematic perspective of a heat shield panel segment of a combustor, according to various embodiments.

Referring now to FIG. 2, a heat shield panel 200 (or combustor panel segment) is illustrated, according to various embodiments. The heat shield panel 200 includes a base 202 and a plurality of rail members, including a first axial rail member 204, a second axial rail member 206, spaced an axial distance from the first axial rail member 204, a first circumferential rail member 208, a second circumferential rail member 210, spaced a circumferential distance from the first circumferential rail member 208 and an intermediate rail member 212. The heat shield panel 200 may also include one or more dilution apertures 214 and one or more mechanical attachments 216 (which may include a threaded stud 217 and a plurality of protrusions 219 (e.g., spacers or pins) arranged around each threaded stud). In various embodiments, the base 202 may be configured as a generally curved (e.g., arcuate) plate, that may be either convex or concave. The base 202 extends circumferentially between a first circumferential end 218 and a second circumferential end 220 and axially between an upstream axial end 222 and a downstream axial end 224. The various rail members are connected to (e.g., formed integral with) the base 202.

The first circumferential rail member 208 is located at (e.g., on, adjacent or proximate) the first circumferential end 218. The second circumferential rail member 210 is located at the second circumferential end 220. The first circumferential rail member 208 and the second circumferential rail member 210 may extend longitudinally (e.g., in an axial direction) along the base 202 and be substantially parallel with one another. The first axial rail member 204 is located at the upstream axial end 222 and the second axial rail member 206 is located at the downstream axial end 224. The intermediate rail member 212 is located axially between the first axial rail member 204 and the second axial rail member 206. The intermediate rail member 212, for example, may be located a distance 226 (e.g., an axial distance) away from the second axial rail member 206 that is equal to between about one-fifteen (1/15) and about one-quarter (1/4) of a length 228 (e.g., an axial length) of the base 202. The first axial rail member 204, the second axial rail member 206 and the intermediate rail member 212 may be substantially parallel with one another, extend circumferentially along the base 202 and be connected to the first circumferential rail member 208 and the second circumferential rail member 210.

The heat shield panel 200 has a hot side 230 (the radial inner surface in FIG. 2) exposed to hot combustion gases and a cold side 232. A plurality of holes 240 (e.g., effusion holes) extend through the heat shield panel 200 and serve to provide a film of cool air on the hot side 230 of the heat shield panel 200. In various embodiments, the plurality of holes 240 may assume a regular pattern. For example, a first circumferential subset of holes 242 (extending in a circumferential direction) could define a first group. The first group of holes could be spaced an axial distance 244 from a second circumferential subset of holes 246 defining a second group. Similarly, a first axial subset of holes 248 (extending in an axial direction) could define a third group. The third group of holes could be spaced a circumferential distance 250 from a second axial subset of holes 252 defining a fourth group. The first axial subset of holes 248 and the second axial subset of holes 252 may extend from the upstream axial end 222 to the downstream axial end 224 or a portion thereof. Similarly, the first circumferential subset of holes 242 and the second circumferential subset of holes 252 may extend from the first circumferential end 218 to the second circumferential end 220 or a portion thereof. While the foregoing is described with respect to axial and circumferential directions with respect to the heat shield panel, the disclosure contemplates any orientation of regular patterns of holes, such as, for example, orientations that extend along lines running at an angle (e.g., a forty-five degree angle) with respect to the axial and circumferential directions.

Figure 2A:
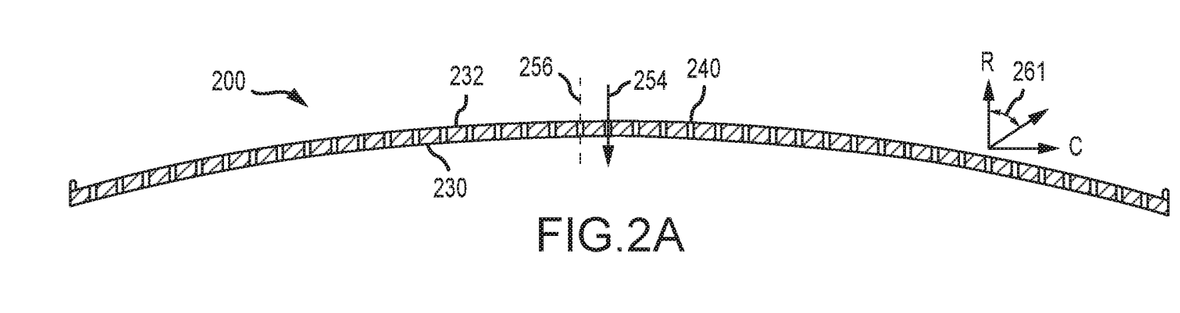
FIGS. 2A and 2B are schematic axial and circumferential sectional views, respectively, of the panel segment illustrated in FIG. 2, according to various embodiments.
Figure 2B:
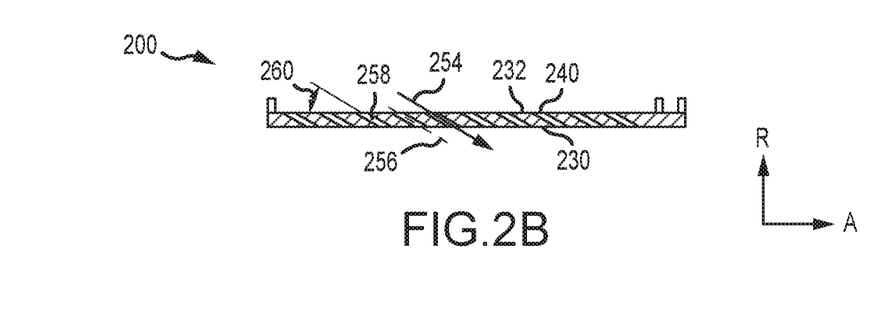

Referring to the sectional views of FIGS. 2A and 2B, in various embodiments, each of the plurality of holes 240 may have a common vector 254. For example, each individual hole 258 within the plurality of holes 240 may be defined by a hole central axis 256 having axial (A), radial (R) and circumferential (C) angular components of the common vector 254 with respect to the heat shield panel 200. In various embodiments, for example, the hole central axis 256 may be oriented at an axial angle 260 within a range of from about twenty degrees (20°) (0.349 rad) to about forty degrees (40°) (0.698 rad). In various embodiments, the hole central axis 256 may be oriented at an axial angle 260 within a range of from about twenty-five degrees (25°) (0.436 rad) to about thirty-five degrees (35°) (0.610 rad). In various embodiments, the hole central axis 256 may be oriented at an axial angle 260 of about thirty degrees (30°) (0.523 rad). In each of the foregoing embodiments, as well as in various embodiments, the hole central axis 256 may be oriented at a circumferential angle 261 within a range of from about negative forty-five degrees (−45°) (−0.785 rad) to about positive forty-five degrees (45°) (0.785 rad), or from about negative twenty-five degrees (−25°) (−0.436 rad) to about positive twenty-five degrees (25°) (0.436 rad) or about zero degrees (0°) (0.000 rad). The disclosure contemplates other orientations of the common vector 254, such as orientations where the common vector 254 points radially inward, that is, where the axial angle 260 is equal to about ninety degrees (90°), and thus should not be limited by the foregoing examples. In various embodiments, the hole central axis 256 is oriented at an axial angle 260 of about thirty degrees (30°) (0.523 rad) and a circumferential angle 261 of about zero degrees (0°) (0.000 rad). For such case, the resulting vector components of the common vector 254 equal about zero (0.000) in the circumferential direction, about cos (30°) (approx. 0.866) in the axial direction (pointing downstream) and about sin (30°) (approx. 0.500) in the radial direction (pointing radially inward).

Figure 3A:
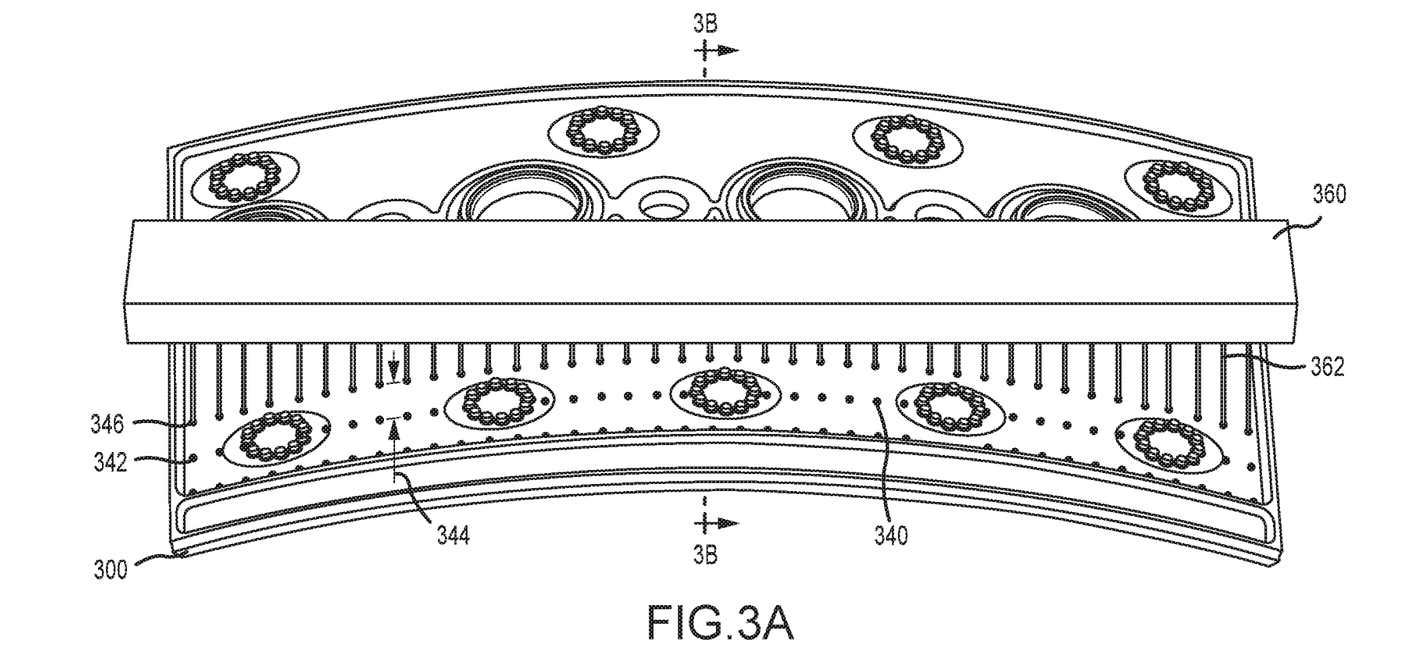
FIGS. 3A and 3B are schematic views of technique employed to drill holes in a heat shield panel segment, according to various embodiments.
Figure 3B:
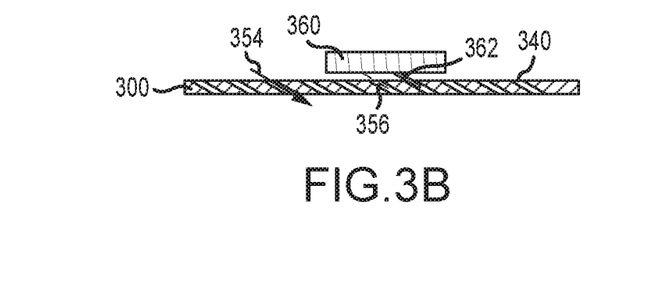

Referring now to FIGS. 3A and 3B, a heat shield panel 300 is illustrated during a process of forming a plurality of holes 340 drilled there through. In various embodiments, the holes 340 are drilled using one or more of electrical discharge machining, laser drilling and water jet drilling. For example, a comb element 360 may include a plurality of electrodes 362, each oriented at a common vector 354 having components corresponding to a hole central axis 356 extending through each of the holes 340. The comb element 360 may be configured to drill multiple holes simultaneously. In various embodiments, a first circumferential subset of holes 342 (illustrated extending from one circumferential end of the panel to the other) is drilled by the comb element 360, each of the first circumferential subset of holes 342 being drilled simultaneously. The first circumferential subset of holes 342 is drilled by plunging the electrodes 362 into the heat shield panel 300 along a common direction, corresponding to the common vector 354. Once the first circumferential subset of holes 342 is drilled, the comb element 360 is withdrawn from the heat shield panel 300 along the common direction. The comb element 360 then traverses in the axial direction an axial distance 344. A second circumferential subset of holes 346 is then drilled simultaneously by plunging the comb element 360 into the heat shield panel 300 along the common direction, corresponding to the common vector 354. The process repeats until each of the plurality of holes 340 is drilled. While the foregoing is described in terms of electrical discharge machining, the disclosure contemplates substitution of the electrodes 362 with sources of laser energy or high pressure water, to drill the holes 340 simultaneously using the techniques of laser drilling and water drilling, respectively.

Figure 4A:
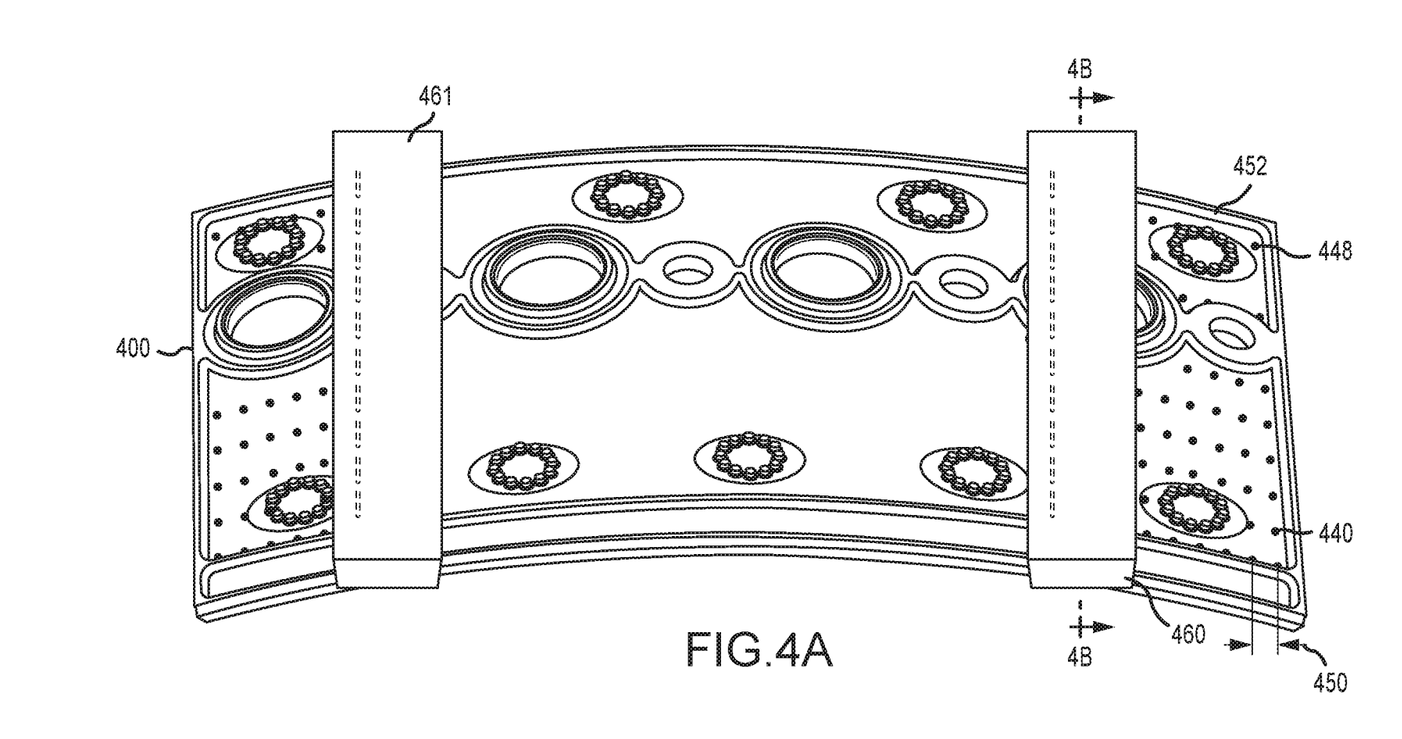
FIGS. 4A and 4B are schematic views of technique employed to drill holes in a heat shield panel segment, according to various embodiments.
Figure 4B:
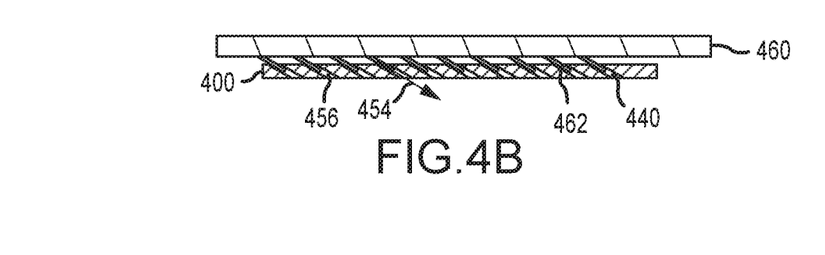

Referring now to FIGS. 4A and 4B, a similar process is illustrated whereby a plurality of holes 440 is drilled through a heat shield panel 400 during the process of forming the panel. For example, a comb element 460 may include a plurality of electrodes 462, each oriented at a common vector 454 having components corresponding to a hole central axis 456 extending through each of the holes 440. The comb element 460 may be configured to drill multiple holes simultaneously. In various embodiments, a first axial subset of holes 448 (illustrated extending from one axial end of the liner to the other) is drilled by the comb element 460, each of the first axial subset of holes 448 being drilled simultaneously. The first axial subset of holes 448 is drilled by plunging the electrodes 462 into the heat shield panel 400 along a common direction, corresponding to the common vector 454. Once the first axial subset of holes 448 is drilled, the comb element 460 is withdrawn from the heat shield panel 400 along the common direction. The comb element 460 then traverses in the circumferential direction an circumferential distance 450. A second axial subset of holes 452 is then drilled simultaneously by plunging the comb element 460 into the heat shield panel 400 along the common direction, corresponding to the common vector 454. The process repeats until each of the plurality of holes 440 is drilled. In various embodiments, a second comb element 461 or a plurality of comb elements may be employed simultaneously to speed the drilling process. The second comb element 461 may be configured to operate on a different portion of the heat shield panel 400 or may be positioned adjacent to the comb element 460. In the latter case, multiple subsets of holes may be drilled simultaneously, followed by traversing a multiple of the circumferential distance 450, corresponding to the number of comb elements being employed. Similar arrangements of multiple comb elements may be likewise configured for the drilling operation described above with reference to FIGS. 3A and 3B. Similar to the above description, the disclosure contemplates substitution of the electrodes 462 with sources of laser energy or high pressure water, to drill the holes 440 simultaneously using the techniques of laser drilling and water drilling, respectively.

Figure 5:
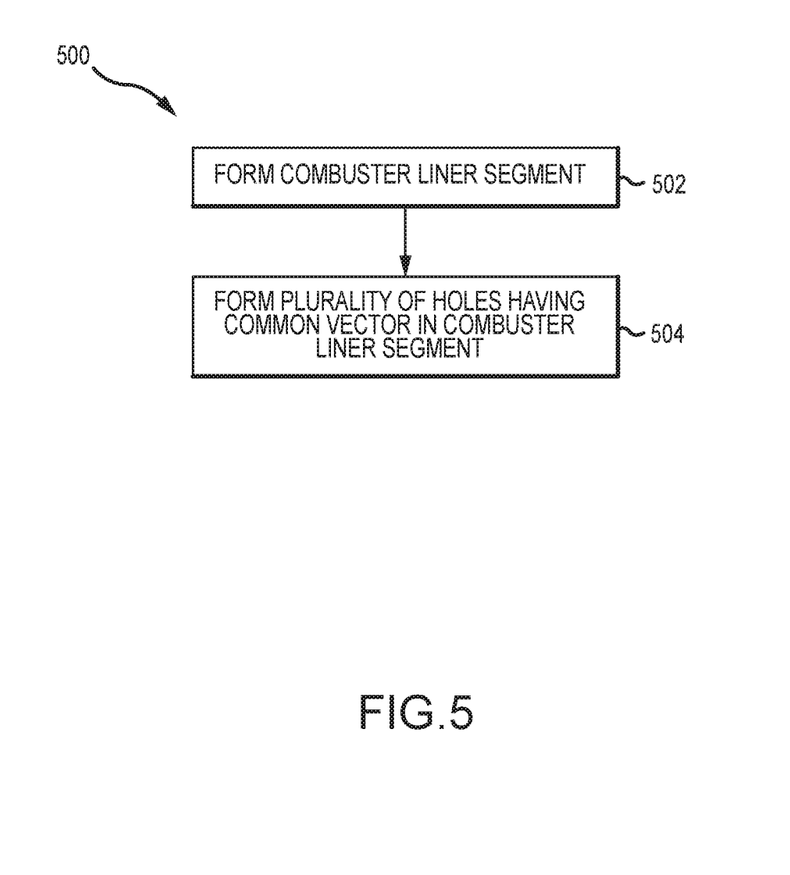
FIG. 5 is a flowchart illustrating a method of forming a heat shield panel segment, according to various embodiments.

Referring now to FIG. 5, a flowchart 500 is provided whereby a heat shield panel may be fabricated. For example, the heat shield panel of any of the embodiments previously described may be formed using a casting process 502, such as an investment casting process. The heat shield panel resulting from the casting process may include a base and rail members extending about the base, similar to those described above. The heat shield panel may also include air dilution holes and any protrusions positioned for spacing the heat shield panel from a shell during assembly. A plurality of holes, each having a common vector, is then formed 504. The plurality of holes may be formed using the techniques described above. Alternatively, the plurality of holes may be formed during the casting process itself. For example, the casting process generally employs a first mold half corresponding to a hot side and a second mold half corresponding to a cold side. Prior to injecting wax into the mold, for an investment casting technique, a plurality of pins corresponding to the plurality of holes may be inserted through one or both of the mold halves along a common vector. Following hardening of the wax and prior to separation of the mold halves, the pins are withdrawn from the one or more mold halves along the common vector. Because the pins each lie on a common vector, they may be inserted into a mold half and removed therefrom simultaneously along the common vector. In various embodiments, the heat shield panel is configured such that one or both of the mold halves may be separated along a pull-plane. In various embodiments, the pull-plane has vector components equal to the vector components of the common vector.

Figure 6A:
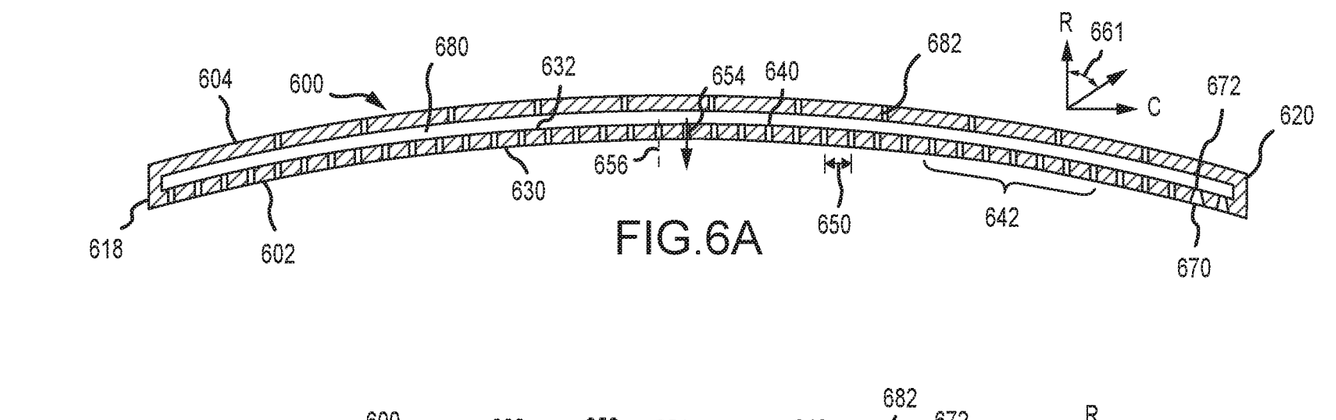
FIGS. 6A and 6B are schematic axial and circumferential sectional views, respectively, of a heat shield panel segment, according to various embodiments.
Figure 6B:
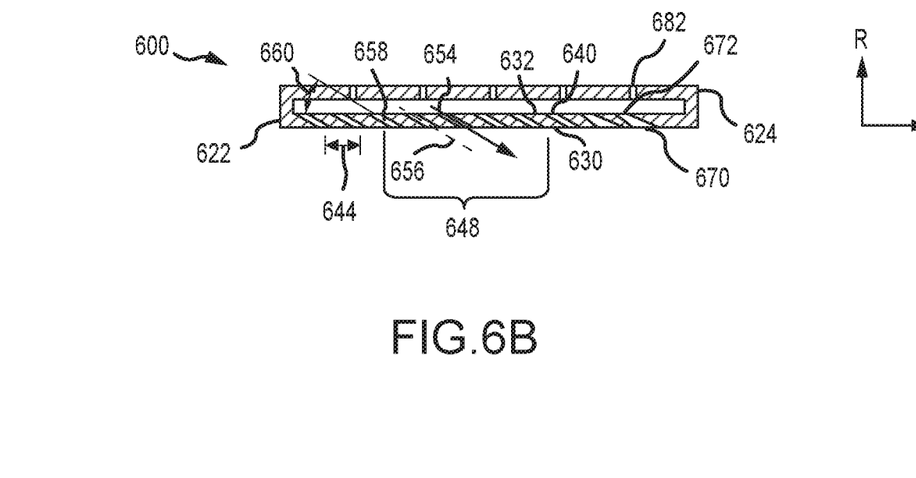

Referring now to FIGS. 6A and 6B, axial and circumferential cross sectional schematic views, respectively, of a heat shield panel 600 are illustrated, according to various embodiments. The heat shield panel 600 includes a first wall 602 and a second wall 604 and, according to various embodiments, may be constructed as an integral unit via, for example, additive manufacture. In various embodiments, the second wall 604 is spaced a distance from the first wall (e.g., in the radial direction) such that a cavity 680 is formed between the first wall 602 and the second wall 604. In various embodiments, a plurality of supply holes 682 may be formed in the second wall 604 to provide a supply of cooling air to the cavity 680.

Similar to the embodiments described above with reference to FIGS. 2, 2A and 2B, The first wall 602 has a hot side 630 (e.g., the radial inner surface in FIG. 6A) exposed to hot combustion gases and a cold side 632. A plurality of holes 640 (e.g., effusion holes) extend through the first wall 602 and serve to provide a film of cool air on the hot side 630 of the heat shield panel 600. In various embodiments, the plurality of holes 640 may assume a regular pattern having similar characteristics described above with reference to FIGS. 2, 2A and 2B, including a first circumferential subset of holes 642 (extending in a circumferential direction) that could define a first group. The first group of holes could be spaced an axial distance 644 from a second circumferential subset of holes (not shown) that define a second group. Similarly, a first axial subset of holes 648 (extending in an axial direction) could define a third group. The third group of holes could be spaced a circumferential distance 650 from a second axial subset of holes (not shown) defining a fourth group. The first axial subset of holes 648 and the second axial subset of holes may extend from an upstream axial end 622 to a downstream axial end 624 or a portion thereof. Similarly, the first circumferential subset of holes 642 and the second circumferential subset of holes may extend from a first circumferential end 618 to a second circumferential end 620 or a portion thereof.

In various embodiments, one or more of the plurality of holes 640 may include a tapered profile, such that, for example, a first hole opening 670 positioned on the hot side 630 of the first wall 602 has a larger cross sectional area than a second hole opening 672 positioned on the cold side 632 of the first wall 602. In various embodiments, each of the plurality of holes 640 may have a common vector 654. For example, each individual hole 658 within the plurality of holes 640 may be defined by a hole central axis 656 having axial (A), radial (R) and circumferential (C) angular components of the common vector 654 with respect to the heat shield panel 600. In various embodiments the hole central axis 656 may be oriented at an axial angle 660 and at a circumferential angle 661 and have the same or similar ranges of orientations described above with reference to FIGS. 2A and 2B, and the heat shield panel 600 and the plurality of holes 640 may be formed and drilled using the same techniques described above with reference to FIGS. 3A-3B, 4A-4B and 5.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A heat shield panel for a gas turbine engine combustor extending circumferentially about a longitudinal central axis, comprising:
   a hot side defining a first surface having an outer perimeter, the first surface defining a curved base extending circumferentially between a first circumferential end and a second circumferential end of the outer perimeter and axially between an upstream axial end and a downstream axial end of the outer perimeter;
   a cold side defining a second surface spaced from the first surface; and
   a plurality of holes extending through the heat shield panel circumferentially about the longitudinal central axis, each hole of the plurality of holes including a central axis having vector components that are identical to a common vector, the common vector defined by a common orientation of a plurality of drilling elements spaced along a comb element and configured to drill the plurality of holes simultaneously,
   wherein a first group of the plurality of holes is positioned on a first circumferential line extending from the first circumferential end of the outer perimeter of the heat shield panel to the second circumferential end of the outer perimeter of the heat shield panel.

2. The heat shield panel of claim 1, wherein a second group of the plurality of holes is positioned on a second circumferential line, extending from the first circumferential end to the second circumferential end and offset an axial spacing from the first circumferential line.

3. The heat shield panel of claim 1, wherein one or more holes within the plurality of holes includes a tapered profile such that a first hole opening positioned on the hot side has a larger cross sectional area than a second hole opening positioned on the cold side.

4. A method of fabricating a heat shield panel for use in a gas turbine engine combustor extending circumferentially about a longitudinal axis, comprising:
   forming a panel having a cold side and a hot side, the hot side defining a first surface having an outer perimeter, the first surface defining a curved base extending circumferentially between a first circumferential end and a second circumferential end of the outer perimeter and axially between an upstream axial end and a downstream axial end of the outer perimeter, the cold side defining a second surface spaced from the first surface; and
   forming a plurality of holes in the panel, the plurality of holes extending through the heat shield panel circumferentially about the longitudinal central axis, each hole of the plurality of holes including a central axis having vector components that are identical to a common vector, the common vector defined by a common orientation of a plurality of drilling elements spaced along a comb element and configured to drill the plurality of holes simultaneously,
   wherein a first group of the plurality of holes is positioned on a first circumferential line extending from the first circumferential end of the outer perimeter of the heat shield panel to the second circumferential end of the outer perimeter of the heat shield panel.

5. The method of claim 4, wherein forming the panel comprises a casting process.

6. The method of claim 5, wherein forming the plurality of holes occurs during the casting process.

7. The method of claim 5, wherein the casting process defines a pull plane having substantially the vector components defining the common vector.

8. The method of claim 4, wherein forming the plurality of holes comprises one or more of electrical discharge machining, laser drilling and water jet drilling, following casting.

9. The method of claim 8, wherein the plurality of holes is formed using the comb element configured to form multiple holes simultaneously.

10. The method of claim 9, wherein the plurality of holes is formed using a plurality of comb elements, each comb element configured to form multiple holes simultaneously.

11. The method of claim 9, wherein the comb element is configured to traverse the panel in a circumferential direction with respect to the panel and wherein a first subset of the plurality of holes is drilled while the comb element is positioned at a first circumferential location and a second subset of the plurality of holes is drilled while the comb element is positioned at a second circumferential location.

12. A heat shield panel for a gas turbine engine combustor extending circumferentially about a longitudinal central axis, comprising:
   a first wall having a hot side defining a first surface having an outer perimeter and a cold side defining a second surface spaced in a radial direction with respect to the longitudinal central axis from the first surface, the first surface defining a curved base extending circumferentially between a first circumferential end and a second circumferential end of the outer perimeter and axially between an upstream axial end and a downstream axial end of the outer perimeter;

a second wall spaced from the first wall in the radial direction such that a cavity is formed between the first wall and the second wall; and a plurality of holes extending through the first wall circumferentially about the longitudinal central axis, each hole of the plurality of holes including a central axis having vector components that are identical to a common vector, the common vector defined by a common orientation of a plurality of drilling elements spaced along a comb element and configured to drill the plurality of holes simultaneously, wherein a first group of the plurality of holes is positioned on a first circumferential line extending from the first circumferential end of the outer perimeter of the first wall to the second circumferential end of the outer perimeter of the first wall.

13. The heat shield panel of claim 12, wherein a second group of the plurality of holes is positioned on a second circumferential line extending from the first circumferential end of the outer perimeter of the first wall to the second circumferential end of the outer perimeter of the first wall.

* * * * *